United States Patent [19]

Nishizawa

[11] 3,789,317

[45] Jan. 29, 1974

[54] SIGNAL CONVERTER WHEREIN PHOTOEMISSION TIME CONSTANT IS UTILIZED

[75] Inventor: Junichi Nishizawa, Sendai, Japan

[73] Assignee: Zaiden Hojin Handotai Kenkyu Shinkokai, Miyagi-ken, Japan

[22] Filed: Sept. 27, 1971

[21] Appl. No.: 184,117

Related U.S. Application Data

[63] Continuation-in-part of Ser. No. 683,920, Nov. 17, 1967.

[52] U.S. Cl. .............................. 331/94.5 C, 330/4.3

[51] Int. Cl. .............................................. H01s 3/00

[58] Field of Search ...................... 331/94.5; 330/4.3

[56] References Cited

UNITED STATES PATENTS

| | | | |
|---|---|---|---|
| 3,509,384 | 4/1970 | Fowler et al. | 331/94.5 |
| 3,431,437 | 3/1969 | Kosonocky | 331/94.5 |
| 3,585,413 | 6/1971 | Nakagome et al. | 331/94.5 |

*Primary Examiner*—Ronald L. Wibert
*Assistant Examiner*—Conrad Clark
*Attorney, Agent, or Firm*—Robert E. Burns; Emmanuel J. Lobato

[57] ABSTRACT

A signal converter, wherein two semiconductor diodes are connected in the forward direction thereof as well as in parallel with a constant voltage source or a constant current source, and wherein a photoemission state of each of the semiconductor diodes is converted by an external light signal so as to perform the flip-flop signal conversion and pulse generation of the emitted light, the time constant of the signal conversion being from $10^{-10}$ to $10^{-12}$ second which is smaller by two to three places than the conventional flip-flop circuit utilizing electric signals.

5 Claims, 18 Drawing Figures

SIGNAL CONVERTER WHEREIN PHOTOEMISSION TIME CONSTANT IS UTILIZED

REFERENCE TO RELATED APPLICATION

This is a continuation-in-part application of the co-pending application Ser. No. 683,920, filed Nov. 17, 1967, for "Signal Converter Wherein Photoemission Time Constant Is Utilized."

BACKGROUND OF THE INVENTION

1. Field of Invention

This invention relates to a logical operation signal converter, and, more particularly, it relates to an apparatus which utilizes such a phenomenon that, when a pn-junction of a semiconductor diode biased in the forward direction thereof is further receptine of a pulse voltage or a light pulse, there is a time delay until the carrier distribution in the diode reaches its stationary state corresponding the same effect as the inductance and capacitance in an electrical circuit.

Opto-electronics utilize the property of light signals to propagate at high velocity. Up to the present time, however, attention has been directed to only the high velocity propagation of these light signals, and there does not appear to be any trend toward utilization of the other properties of the light signals. In particular, the logic apparatus, or the flip-flop circuit above all things, performs setting and resetting operations by reversal of its stable state, although its time constant is at best $10^{-8}$ second or so in the apparatus of a type, wherein the conventional electrical circuit is utilized.

2. Description of Prior Arts

The following are the list of known arts relative to the present invention.

a. U.S. Pat. No. 3,239,688 (Price) teaches to arrange a plurality of laser diodes so as to cause each of these diodes to emit logical laser light. No idea of constructing an opto-logical apparatus having a flip-flop circuit of small time constant by utilizing the capacitive and inductive properties of the diode due to its photoemission is taught.

b. U.S. Pat. No. 3,245,002 (Hall) is a basic invention about the injection type laser diode.

c. U.S. Pat. No. 3,312,910 (Offner) is concerned with frequency modulation in light emitted from diode.

d. U.S. Pat. No. 3,427,563 (Lasher) is directed to a maser device having two bi-stable photoemission states, i.e., spontaneous emission and inductive emission. The maser device includes a resonance cavity, in which both a light emitting region and a light absorbing region co-exist, and, in accordance with variation in the rate of absorption in this light absorbing region, any one of the abovementioned stable photoemission states is realized. The modulation in the rate of absorption in the light absorbing region, or in the photoemission state in the light emitting region is carried out by injected pulse current which has been forwardly biassed. No idea of causing light to change over these stable states is taught.

e. U.S. Pat. No. 3,478,280 (Fenner) relates to a laser diode capable of oscillating a laser light having a light pulse width which can be modulated.

f. U.S. Pat. No. 3,483,383 (Konnerth) is directed to photo-communication utilizing light per se emitted from a laser diode, an amplitude-modulation diode, and method of detecting light from such diode.

g. U.S. Pat. No. 3,483,529 (Fenner) teaches to use an injection type laser diode as an element capable of performing write-in operation and non-destructive read-out in memory.

h. U.S. Pat. No. 3,303,431 (Fowler) discloses a device consisting of two laser diodes, wherein a pn junction of each diodes is arranged to position within the same plane, and any one of the two diodes is made for an output, and the other for light modulation. By modulating light from the diode for modulation, laser light from the diode for output can be modulated.

i. U.S. Pat. No. 3,457,468 (Kawaji) relates to a light signal device for high speed transmission of a signal by utilizing light-coupling semiconductor for transmitting light, and converting an electrical signal to a light signal.

j. U.S. Pat. No. 3,484,713 (Fenner) teaches to carry out bi-stable oscillation by combining two laser diodes, through which mutual oscillation is controlled and adjusted. No capacitive and inductive properties in the current versus voltage characteristics due to variation in light emission of the diode or carrier distribution therein are utilized.

k. U.S. Pat. No. 3,431,437 (Kosonocky) is directed to a photo-digital device, in which photoemission of the laser diode is carried out in digital form.

l. U.S. Pat. No. 3,430,160 (Kosonocky) teaches that, in order to excite first and second resonator structures in a laser light emissive substance having different resonator structures, an alternating signal is applied to the laser substance of the first or second resonator structure to cause this first or second resonator structure to perform oscillation of OR or NOR. In this device, however, the photoemission phenomenon in this laser substance depends primarily on injection of pulse current.

m. Kelly's IBM Technical Disclosure Bulletin, Vol. 7, No. 11, page 1073, April 1965 describes an effect of quenching laser oscillation of one laser diode by laser oscillation of another.

SUMMARY OF THE INVENTION

It is therefore an object of the present invention to provide a signal converter of a type, wherein the time constant can be made smaller than that of the conventional logical operation signal converter utilizing an electrical circuit.

It is another object of the present invention to provide a flip-flop device and light pulse generator, in which photoemission time constant of a laser diode is positively utilized.

The nature, principle and details of the present invention will become more apparent from the following description of the invention, when read in conjunction with the accompanying drawing.

DETAILED DESCRIPTION OF THE INVENTION

Figure 1:
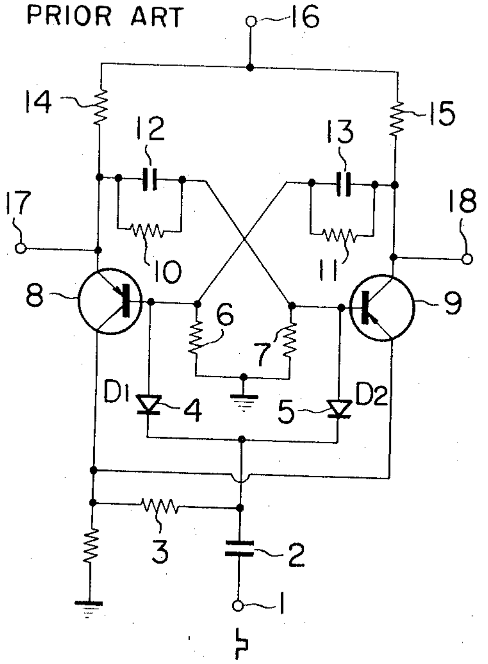
FIG. 1 PRIOR ART
FIG. 1 is a wiring diagram of a flip-flop circuit in a conventional electrical circuit.

Referring first to FIG. 1, the conventional flip-flop circuit consists of a trigger terminal 1, a capacitor 2, a resistor 3, diodes 4 and 5, resistors 6 and 7, transistors 8 and 9, resistors 10 and 11, capacitors 12 and 13, resistors 14 and 15, bias terminal 16, and output terminals 17 and 18, of which, when one of the terminals is in "set" position, the other terminal is in "reset" position. This flip-flop circuit possesses a bi-stable state which can be realized by placing the transistors 8 and 9 into "on" or "off" state.

In this flip-flop circuit, a trigger pulse is applied to the base of the transistors 8 and 9 by establishing a condition in the circuit such that the base voltage is substantially zero volt when the transistors are in "on" state, and it takes a positive voltage when they are in "off" state. Accordingly, there is no chance of the diodes 4 and 5 being biased in the forward direction thereof with the result that, even when such trigger circuit is provided, or an idling flip-flop circuit is provided, the operation of the flip-flop circuit in its stopped state is not affected at all. When a positive pulse is applied to the trigger input terminal, if the transistors 8 or 9, to which the pulse is first applied, is in "off" state, this "off" state becomes reversed.

In such type of flip-flop circuit utilizing the electrical circuit, however, as the time constant is at best $10^{-8}$ second or so, the signal conversion speed is also difficult to exceed this limit.

According to the present invention, it is possible that, when electrical or light signals are applied to a semiconductor diode, these signals can be converted secondarily depending on external conditions or conditions inherent in the semiconductor diode. For example, even when the pn junction of the semiconductor diode is pulse biased in the forward direction of the diode, no light signals immediately generate from the pn junction in response to the forward biasing, but the light signals change at a certain time constant. This phenomenon signifies that, even when the pn junction of the abovementioned semiconductor diode is forwardly biased, distribution of the carriers injected in the pn junction does not necessarily reach its stationary state at once, but it attains such state after lapse of a certain definite time lag. Accordingly, it can be considered that there is a time constant for the intensity of the re-coupled light of the injected carriers to attain its stationary state. This time constant is usually from $10^{-10}$ to $10^{-12}$ second.

Figure 2:
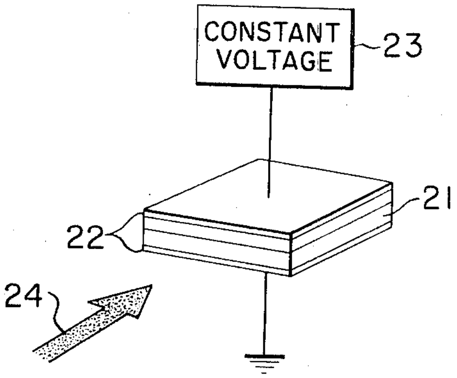
FIG. 2 is an explanatory diagram showing a photoemission characteristic of a semiconductor diode having a pn-junction, when it is connected to a power source in the forward direction thereof.
Figures 3A, 3B:
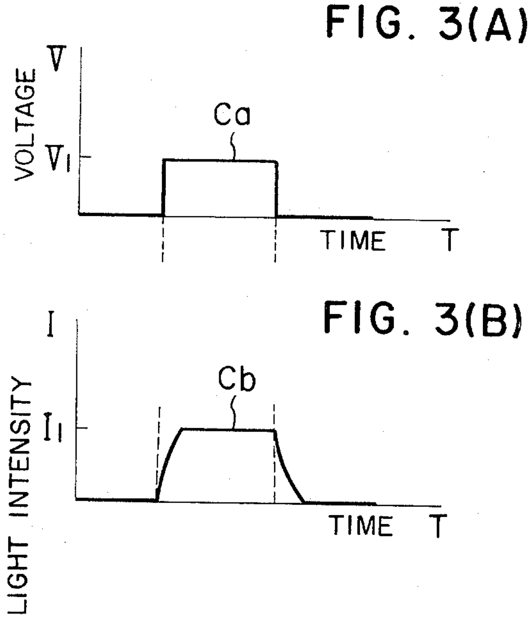
FIGS. 3(A) to 3(D) indicate that, when pulse waveforms as shown in FIGS. 3(A) and 3(C) are applied to the semiconductor diode as shown in FIG. 2 in its forward direction, the diode emits light of the character as shown in FIGS. 3(B) and 3(D), respectively.
Figure 3C:
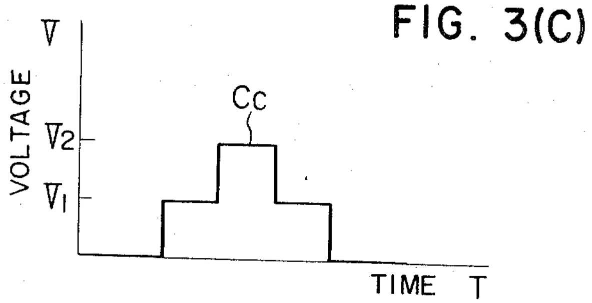

In the following, the principle of the present invention will be described with reference to a semiconductor laser diode (hereinafter referred to simply as "diode") shown in FIG. 2 prepared by first forming a pn junction therein by diffusion of an N-type GaAs semiconductor substrate 21, then cleaving the mutually opposing four sides of the substrate in the crystal plane of $< 100 >$ so as to make the GaAs substrate a resonator type structure, and attaching electrodes 22 on both surfaces of the substrate. 1. In the first place, assume that the abovementioned diode is forwardly biased. When this forward bias is a rectangular pulse voltage having a time (T) versus voltage (V) characteristics as shown in FIG. 3(A), the photoemission due to re-coupling of the carriers to be injected into the pn junction of the diode does not always reach instantly the stationary state of the carrier distribution. Accordingly, intensity of the re-coupled light emitted from the pn junction of the diode assumes a curve having the time (T) versus light intensity (I) characteristics as shown in FIG. 3(B). From the curve $C_b$ in FIG. 3(B), it is understood that the time delay (i.e, time constant) until the carrier distribution reaches a stationary state depends on the value of voltage applied to the diode, which is, for example, from $10^{-6}$ to $10^{-8}$ second. When the voltage applied is low, no laser oscillation is created, but only spontaneous emission. However, when the voltage is made sufficiently high, and a pulse voltage of a stepwise waveform having the time (T) versus voltage (V) characteristics as shown in FIG. 3(C) is applied to the diode, the re-coupled light of the carrier generated at the stage $V_1$ where the voltage is still low is the spontaneous emission same as the re-coupled light as in FIG. 3(B). However, at the stage of the voltage being increased as at the stage $V_2$, as it takes some time instant until the injected carriers into the pn junction of the diode reach the equilibrium state, the re-coupled light due to these injected carriers becomes gradually intensified. When the laser oscillation commences, impedance of the diode becomes gradually lowered. As a consequence, current flowing through the diode gradually increases, because the power applied to the diode is from the constant voltage source, and, moreover, as the carriers shorten their life when the laser oscillation is generated to cause inductive emission, there appears a tendency such that intensity of light becomes weakened rapidly, because at the time instant when the voltage is increased, the light is intensified, but the amount of the carriers decreases simultaneously for the increased light intensity.

Figure 3D:
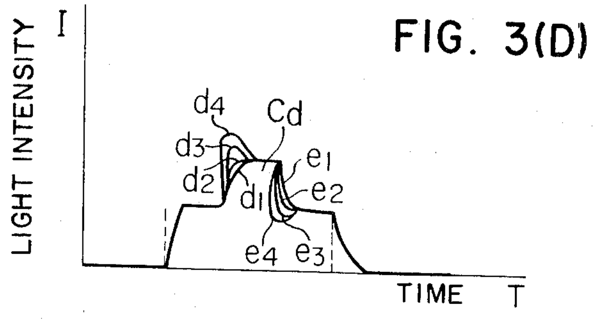
Figure 4A:
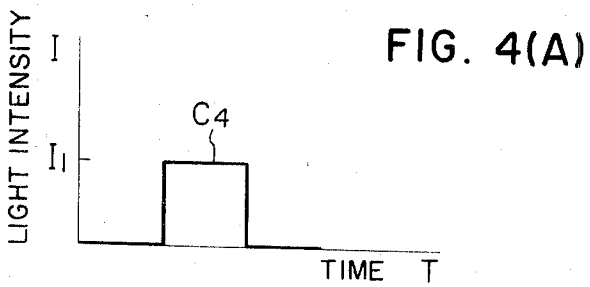
FIGS. 4(A) and 4(B) respectively show a light pulse waveform to be applied from outside to the semiconductor diode shown in FIG. 2, and the photoemission character attained thereby by the semiconductor diode.
Figure 4B:
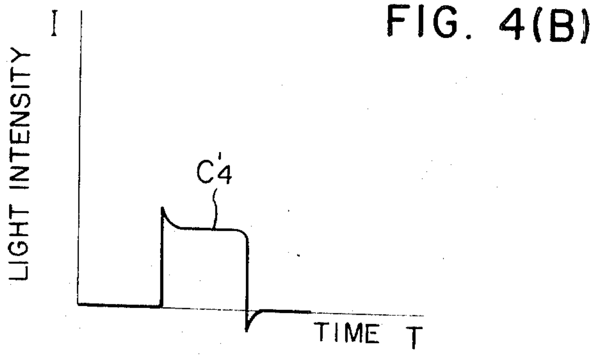

The time versus photoemission characteristic of the diode to be obtained by the stepwise application of voltage as shown in FIG. 3(C) can be indicated by the curve $C_d$ as in FIG. 3(D). In this figure, the curves $d_1$, $d_2$, $d_3$, and $d_4$ denote that the stronger the effect of voltage applied to the diode and the influence of the laser oscillation are, the higher becomes the intensity of the emitted light. Next, when the voltage is decreased to the stage $V_1$ in the time (T) versus voltage (V) characteristics as shown in FIG. 3(C), a phenomenon opposite to the abovementioned takes place with the consequent decrease in the carriers to be injected into the diode, and increase in impedance. Consequently, the current and the carriers to be injected decrease, and, where the effect of the laser oscillation still remains, i.e., if the life of the carriers is short, the intensity of the photoemission of the re-coupled light becomes lower than in the case of its stationary state, which shows changes as shown in the curves $e_1$, $e_2$, $e_3$, and $e_4$. From these phenomena, the laser light emission of the diode possesses a property like inductance (the so-called L property), though this L property of the diode may in some cases be affected by an external circuit, to which the diode is connected. 2. In the second place, when a forward current flows in the diode 21 connected to the constant voltage source 23 as shown in FIG. 2, if laser light 24 is irradiated from outside onto the pn junction of the diode 21, no laser oscillation occurs in case the current flowing in the diode is lower than the threshold current — a current necessary for generating laser oscillation. However, when a forward current corresponding to 80 to 90 percent of the threshold current flows in the diode, strong laser oscillation is generated, if laser light is irradiated onto the diode. That is, when a laser light whose time (T) versus light intensity (I) characteristic is of a light pulse waveform as shown by a curve $C_4$ as in FIG. 4(A) is irradiated onto the diode 21, strong laser light is emitted from the pn junction of the diode. In this case, the time delay from irradiation of the abovementioned light pulse to the laser oscillation of the diode is of the order of $10^{-12}$ second, though it depends upon the value Q of the resonator of the diode. However, as the carrier distribution does not reach the stationary state within this order of the time instant, photoemission of a wave-form as shown by a curve $C'_4$ in FIG. 4(B) is obtained. It will be seen from this curve that, at the first moment, a strong laser light is obtained, but the light gradually attains its stationary state because the carriers immediately decrease from the next moment due to re-coupling of the light. In contrast to this, when the intensity of laser light to be irradiated onto the diode is rapidly made low, the laser oscillation stops with the carriers to be injected into the diode being kept small. Accordingly, the life of the carriers is determined by only the natural transition thereof, in this case, and the light intensity becomes momentarily weak, which however reinstates its initial state to produce the photoemission of the curve $C'_4$. This photoemissive characteristic is considered to be equal to the capacitive characteristic of the photoemission of the diode (the so-called C property).

Figures 5A, 5B, 5C:
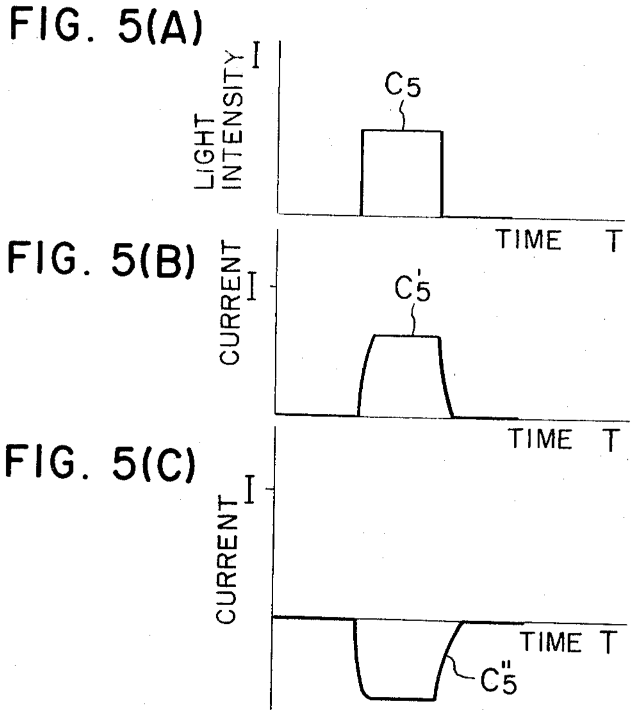
FIGS. 5(A) to 5(C) are respectively characteristic diagrams shown interrelationship between the light pulse applied to the semiconductor diode of FIG. 2 and the current waveform flowing in the diode with application of the light pulse, when the diode is connected with a constant current source.

As mentioned in the foregoing, the photoemission characteristic of the diode is governed by irradiation of the external light (pulsed laser light). The same photoemission phenomena can take place on the exactly same principle as explained in the foregoing by the interaction between non-laser light such as natural light as the external light and the diode, from which natural light (or non-laser light) is emitted. 3. In the third and last place, when the forwardly biased diode is in a state of the spontaneous emission, it is possible to cause the laser oscillation with the diode which has so far been in the state of spontaneous emission, if a light pulse having the time (T) versus light intensity (I) characteristic as shown by a curve $C_5$ in FIG. 5(A) is applied to the diode, and a current corresponding to 80 to 90 percent of the threshold current necessary for the laser oscillation flows therethrough. When the laser oscillation occurs, life of the carriers becomes shorter owing to the inductive emission with the result that inductance of the diode (L Property) becomes small, and the current flowing through the diode increases. The change in the current in this case does not also take place rapidly, but a pulse waveform as shown by a curve $C'_5$ having the time (T) versus current (I) characteristic as in FIG. 5(B) is obtained.

In the above-described principle of the present invention, the direction of the light irradiation to the diode is in the direction of the photoemission of the diode. Also, when a laser light is irradiated from outside onto the diode which has so far been in the laser oscillation in the direction perpendicular to that of the laser light emission thereof, the L property of the diode increases and the current flowing therethrough decreases with the consequence that the diode is subjected to the spontaneous emission. In this case, the so-called "quenching effect" of the diode can be observed, in which the time constant is determined by the L property of the diode. It is usually from $10^{-10}$ to $10^{-12}$ second, at which the current waveform becomes as shown by a curve $C''_5$ as in FIG. 5(C).

PREFERRED EMBODIMENTS

In order to enable skilled persons in the art to reduce the present invention into practice, the following preferred embodiments are presented. It should however be noted that the invention is not limited to these examples of application alone, but any changes and modifications utilizing the transition phenomenon of the diode according to the present invention may be possible within the scope of the invention as recited in the appended claims.

i. Flip-flop Element

Figure 6A:
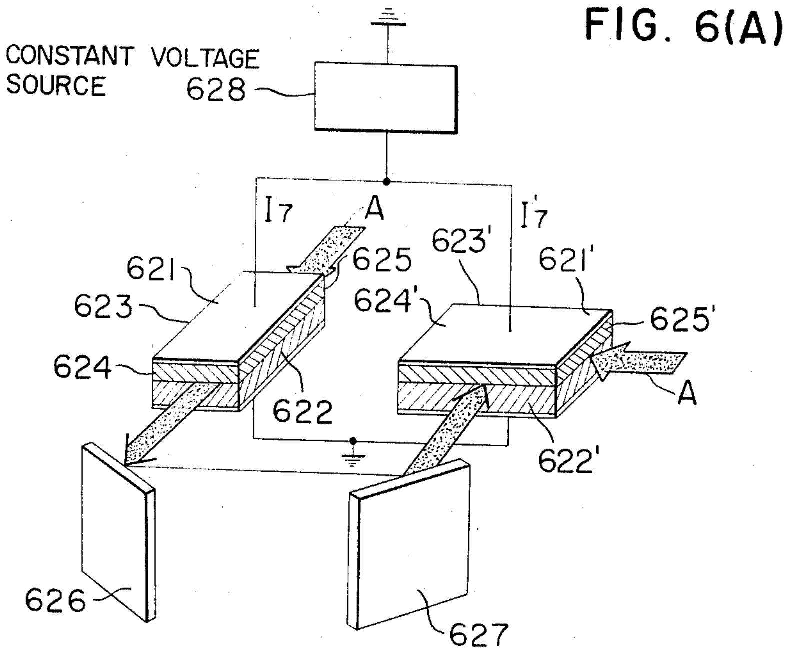
FIG. 6(A) is a schematic view of the logical operation signal converter according to the present invention.
Figures 6B, 6C, 6D:
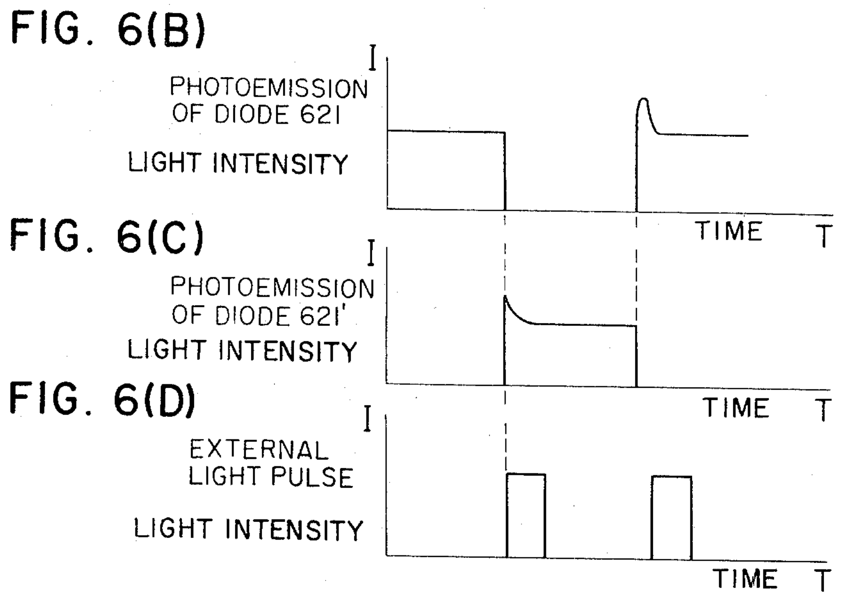
FIGS. 6(B) and 6(C) show the photoemission characteristic of the semiconductor diode to be used in the apparatus of FIG. 6(A)
FIG. 6(D) shows the waveform of external light pulse to be applied to the semiconductor diode of FIG. 6(A)

The flip-flop element according to the present invention as shown in FIG. 6(A) comprises two laser diodes 621 and 621', two reflective mirrors 626 and 627, and a constant current source 628, to which the two diodes are connected in parallel.

The laser diodes 621 and 621' are respectively provided with cleavage planes 624, 625 and 624', 625' in the direction perpendicular to the direction of the laser light emission. The other planes 622, 623 and 622', 623' of the diode which are parallel to the direction of the laser light emission are made rough by sand blasting, etc..

Figures 7B, 7C:
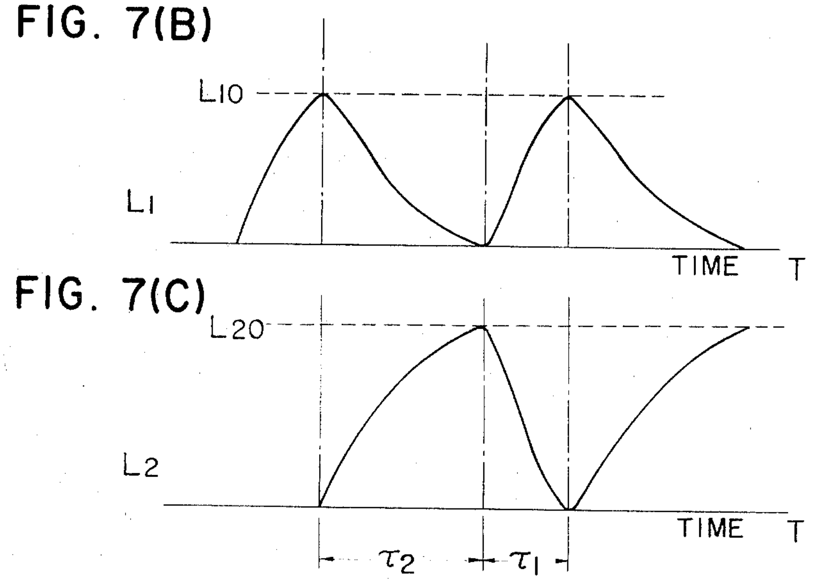
FIGS. 7(B) and 7(C) are the photoemission characteristics to be obtained by the light pulse generator shown in FIG. 7(A).

Laser light from the laser diode 621 enters into the pn junction of the other laser diode 621' from the side of the rough surface 622' by way of coupling means including the reflective mirrors 626 and 627, and laser light from the laser diode 621' enters into the pn junction of the laser diode 621 from the side of 622 thereof. Currents $I_7$ and $I'_7$ are caused to flow through the respective laser diodes 621 and 621' of the abovementioned construction from the constant voltage 628. The respective currents are larger than the threshold current of each of the diodes. Accordingly, laser lights from the two laser diodes mutually function to extinguish the laser light emission of the opposite diode, although, due to turbulence at the initial stage of the laser oscillation, either one of the laser diode emits laser light, and the other diode is brought into a state of being quenched by the laser light of that diode. In order, however, that any one of the laser diodes as selected is brought to a state of emitting laser light, a setting may be made in such a manner that light from other diode is prevented from entering into the pn junction of the diode. For example, in order to bring the diode 621 into a state of emitting laser oscillation and the other diode 621' into a quenched state, it is only sufficient that photoemission from the diode 621' be temporarily prevented from projecting into the diode 621 by means of a shutter, etc. In so doing, the diode 621' is quenched by the laser light from the diode 621, but no reverse phenomenon takes place, even though electric current sufficient to cause the laser light emission flows in both diodes. Once the shutter is used temporarily, even if it is removed, the state is maintained, and the diode 621 continues the laser light emission, and the diode 621' is still quenched. Under such conditions, when laser light is projected into the pn junction of each of the diodes 621, 621' from the planes 625, 625' of the respective diodes perpendicular to the direction of the laser light emission, the diode 621' which has not been subjected to the laser light emission instantaneously emits strong laser light during the transition period, however, the diode 621 which has already been emitting laser light is not almost affected thereby, so that the diode 621 is finally quenched by the instantaneous, strong laser light of the diode 621' and the latter emits laser light. Next, when laser light is again projected into the pn junction of each of the diodes 621, 621' from the planes 625, 625' of the respective diodes, the diode 621' is similarly quenched, and the diode 621 emits laser light. Thus, the setting and resetting are performed to obtain the flip-flop operation with the laser light emission and the spontaneous emission as the two stabilized points. FIGS. 7(B) and 7(C) indicate the flip-flop operation.

While there have been many proposals for the flip-flop element utilizing the laser diode such as for example in the abovementioned U.S. Pat. No. 3,427,563 (Lasher), U.S. Pat. No. 3,431,437 (Kosonocky), etc., the flip-flop using the laser diode according to the present invention has the following features.

a. The apparatus is actuated by light signal, i.e., the input signal is not electric current, but light per se.

b. Setting and resetting operations can be performed with the projecting point of the light signal being kept unchanged. That is, in the known art such as the abovementioned U.S. Pat. No. 3,431,437, the places where a set signal and a reset signal are projected are entirely different. When the projecting position is same as in the present invention, the operation becomes simplified, and any erroneous operation due to stray light can be reduced to the minimum.

c. The flip-flops proposed in the abovementioned patents make use of the flip-flop operation in the stationary state. That is, change of the laser diode from one stationary state (in one stabilized point) to another stationary state (in another stabilized point) does not take place during the transition period of the input signal, but it occurs when the input signal becomes stationary.

The flip-flop of the present invention, however, utilizes the transition period of the input signal, whereby high speed performance can be secured. The response time of the present flip-flop, though it depends upon the value Q of the laser diode as aforedescribed, is of the order of $10^{-2}$ second. According to the present invention, it has been verified that a high response speed of $4 \times 10^{-12}$ with respect to input signal by using a Fabry-Perot type laser diode of a size of 0.3 mm × 0.1 mm provided with a pn junction grown by the liquid-phase method.

ii. Light Pulse Generator

Heretofore, various oscillators utilizing optical delay line have been devised (U.S. Pat. No. 3,431,437 of Kosonocky, for example). The present invention as its another application of the semiconductor laser diode is to provide a light pulse generator utilizing the time constant of the laser light emission of the laser diode without use of such delay line as in the known device.

Figure 7A:
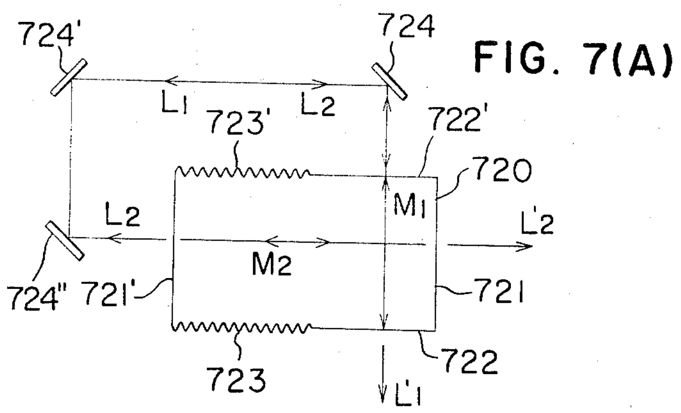
FIG. 7(A) is a schematic plan view showing the general construction of the light pulse generator according to the present invention.

The light pulse generator according to the present invention is constructed as shown in FIG. 7(A) with a laser diode 720, and reflectors 724, 724', 724''. A pair of parallel planes 721, 721' of the diode are the cleavage surfaces of the semiconductor substrate material, and the other pair of parallel planes consist of partly rough planes 723, 723' due to sand blasting, and partly cleavage planes 722, 722'. The distance between the cleavage planes 721, 721' is longer than that between the cleavage planes 722, 722' (i.e. the diode is of a rectangular cross-section), hence the threshold current of the laser oscillation $M_1$ between the planes 722 and 722' is smaller than that of the laser oscillation $M_2$ between the planes 721, 721'.

When electric current is caused to flow in the laser diode thus constructed, the laser oscillation $M_1$ is first generated, and intensified with lapse of time, and finally laser light $L_1$ is emitted from the diode. However, this emitted laser light $L_1$ is reflected by the three reflectors 724, 724', and 724'' during its travelling, and finally returns to the diode, from which it was emitted, to enter into the pn junction thereof from the plane 721'. Upon projection into the diode of this laser light $L_1$, the laser oscillation $M_1$ which has still been continuing is extinguished, and laser oscillation $M_2$ is induced. Accordingly, the laser oscillation $M_1$, once it is generated, is gradually intensified with a certain time constant in accordance with the principle of the present invention. Thus, when laser light $L_1$ emitted from this laser oscillation $M_1$ attains its intensity necessary to extinguish the laser oscillation $M_1$, the laser oscillation $M_1$ is diminished, and laser oscillation $M_2$ is generated. This laser oscillation $M_2$ also gradually increases its intensity, and laser light $L_2$ emitted thereby inevitably functions to extinguish the laser oscillation $M_2$ and to strengthen the laser oscillation $M_1$, so that the laser oscillation $M_2$ is extinguished by the laser light $L_2$ and the laser oscillation $M_1$ is again generated. Thus, the laser oscillations $M_1$ and $M_2$ are alternately generated at a frequency of the order of $10^{12}$ cps, though it usually depends on the time constant of the diode.

Referring to FIGS. 7(B) and 7(C), $\tau_1$ denotes a time constant, when laser light emission takes place between the cleavage planes 722, 722' of the diode 721 by a light signal $L_2$, and $\tau_2$ is a time constant, when laser light emission occurs between the cleavage planes 721, 721' by a light signal $L_1$. These time constants $\tau_1$ and $\tau_2$ are determined by the value Q of the diode, and the relationship of $\tau_1 \neq \tau_2$ is due to difference between the value Q of the resonator formed by the cleavage planes 722, 722' and that of the resonator formed by the cleavage planes 721, 721'. Generally, in the case of the Fabry-Perot type resonator, the time constant becomes greater as the length of the distance between the cleavage planes becomes longer. For example, in the case of a laser diode of a dimension of 0.3 mm × 0.2 mm provided with a pn junction grown from the liquid phase method, it is possible to obtain the time constant of $4 \times 10^{-12}$ second, hence a pulse oscillation of $2.5 \times 10^{11}$ is possible. Also, by varying size of the diode, especially length thereof in the direction of the laser oscillation, a time constant of a range of from $10^{-10}$ to $10^{-12}$ can be obtained.

What I claim is:

1. A light signal converter which comprises in combination:

a. a semiconductor laser diode having a pn junction, and at least one pair of mutually opposed planes formed in the direction perpendicular to the surface of said pn junction in said diode;

b. an electric power source connected to said semiconductor laser diode, and applying to the pn junction of said semiconductor laser diode a forward current having a current value greater than the threshold value necessary to develop spontaneous emissions therefrom and slightly less than a threshold value necessary for laser oscillation of said semiconductor laser diode;

c. means for irradiating light in pulse form upon said pn junction of said semiconductor laser diode to develop laser oscillation therein and to thereby effect a light emission pulse having a transitional period at the leading edge thereof comprising an overshoot; and d. means for taking out the light output transitionally generated within said semiconductor laser diode therefrom.

2. A light pulse generator which comprises in combination:

a. a semiconductor laser diode having a pn junction, a rectangular cross-sectional configuration and two pair of mutually opposed planes; the opposed planes at the short side thereof being cleaved in the direction perpendicular to said pn junction thereof, a part of the opposed planes at the long side thereof also being cleaved in the direction perpendicular to the pn junction and the remaining portion of said long side planes being made rough;

b. an electric power source connected to said semiconductor laser diode and applying a forward current having a value above the threshold value necessary for the laser oscillation of said semiconductor laser diode; and c. light irradiating means to directly project with substantially no time delay the laser light emitted from said short side cleavage plane of said semiconductor laser diode onto said pn junction of said long side cleavage plane of said diode to effect the alternating quenching of the light emitted from each pair of opposed planes for a time duration equal to the time constant of the corresponding mutually opposed planes.

3. An opto-logical device comprising: two semiconductor laser diodes each having a pn junction and a first pair of opposite non-reflective surfaces perpendicular to said junction and a second pair of opposite refelective surfaces perpendicular to said junction one surface of which is receptive of pulses of light energy irradiated thereon during use; means for applying a bias potential across each laser diode having a value above the threshold value necessary to develop spontaneous emissions therefrom and slightly less than the threshold value necessary to develop laser oscillations therein whereby each laser diode is operative in one mode when light energy having a magnitude greater than a first value is irradiated upon one surface of said first pair of surfaces to quench laser emissions having an magnitude less than said first value and is operative in another mode when said light energy is irradiated upon said one surface of said first pair of surfaces and a light energy pulse is irradiated upon said one of said second pair of surfaces to excite the quenched diode to develop laser oscillations therein and to thereby effect the emmission of a laser emission pulse having a transitional period at the leading edge which has a magnitude greater than said first value and the magnitude of the remaining portion of said laser emission pulse is less than said first value; coupling means for directing laser emissions emitted from the other surface of said second pair of surfaces of each diode to one of said first pair of surfaces of the other diode thereby optically coupling the diodes to enable the coupled diodes to assume either a first stable state wherein one diode is emitting laser emissions and the other diode is quenched or a second stable state wherein said another diode is emitting laser emissions and said one diode is quenched; whereby each pulse of light energy irradiated upon said one surface of said second pair of surfaces of the quenched diode effects the laser oscillations and the emission of said laser emission pulse by the quenched diode thereby to quench the laser emissions of the emitting diode during said transitional period and to change the state of the coupled diodes to the other stable state.

4. A device according to claim 3, wherein both diodes are disposed in a position such that the two junctions are in the same plane.

5. A method for switching two semiconductor laser diodes comprising: providing two semiconductor laser diodes, each diode having a pn junction and a first pair of opposite non-reflective surfaces perpendicular to said junction and a second pair of opposite reflective surfaces perpendicular to said junction; biasing said two diodes with a potential thereacross having a value above the threshold value necessary to develop spontaneous emissions therefrom and slightly less than the threshold value necessary to develop laser oscillations therein ; optically coupling laser emissions emitted from one of said second pair of surfaces of each diode to another one of said first pair of surfaces of the other diode thereby enabling the coupled diodes to assume either a first stable state wherein one diode is emitting laser emissions and the other diode is quenched or a second stable state wherein said another diode is emitting laser emissions and said one diode is quenched; irradiating light energy pulses upon the other surface of said second pair of surfaces of the quenched diode, each pulse having sufficient energy to excite the quenched diode to develop laser oscillations therein and to thereby effect the emission of a laser emission pulse having a transitional period at the leading edge wherein the amplitude is greater than the amplitude of the remaining portion of said laser emission pulse and wherein the amplitude during said transitional period is sufficient to quench the emitting diode thereby changing the state of the coupled diodes during said transitional period to the other stable state.

* * * * *